INVENTOR.
OLIN W. BOUGHTON
BY
Beau, Brooks, Buckley + Beau
ATTORNEYS

United States Patent Office 3,260,157
Patented July 12, 1966

3,260,157
MICROSCOPE ADJUSTMENT MECHANISM WITH COAXIAL COARSE AND FINE ADJUSTMENT SHAFTS AND DIFFERENTIAL SCREW MEANS
Olin W. Boughton, Williamsville, N.Y., assignor to American Optical Company, Southbridge, Mass.
Filed Aug. 31, 1962, Ser. No. 220,771
2 Claims. (Cl. 88—39)

This invention relates generally to microscopes and pertains, more particularly, to improvements in microscope construction and means for adjusting the optical systems thereof.

In microscopes, it is desirable to have as rigid a support structure therefor as is possible so that vibrations, and the like, will not interfere with the quality of the image. Recent developments in the optical systems for microscopes has permitted the stage and eyepiece to both remain fixed, that is commonly mounted upon a rigid supporting framework or structure, leaving only the microscope objective to be adjusted relative to the object on the stage. This optical system permits of an extremely rigid mounting for the eyepiece and the stage since no requirement for relative vertical adjustment therebetween is necessitated for focusing purposes. The present invention is directed with particularity to adjustment means for the nosepiece carrying a plurality of microscope objectives in a system as aforesaid wherein relatively coarse and relatively fine adjustments may be achieved by manipulating adjacent and closely spaced knob members. Therefore, it is of primary concern in connection with the present invention to provide a coarse and fine adjustment for microscopes particularly of the type stated hereinabove and, more particularly, it is a primary objective of this invention to provide such adjustment means which is characterized by its relative simplicity while at the same time being fully effective to achieve the desired results.

More particularly, it is an object of the present invention to provide a coarse and fine adjustment for microscopes generally as aforesaid wherein a rotary cam member is utilized for achieving the coarse adjustment, rotary motion to the cam being imparted for this purpose and wherein there is also associated with such rotary cam means for effecting translatory motion thereof to achieve fine adjustments for the microscope.

More specifically, an object of the present invention is to provide fine adjustment means for effecting translatory movement of a rotary cam member utilizing the difference in pitch or lead of two screw threaded elements for such effect whereby the differential motion afforded by such difference in pitch or lead may be utilized to achieve an extremely fine adjustment which would otherwise be unobtainable by the use of a single screw thread element.

Other objects and advantages of the invention will appear from the description hereinbelow and the accompanying drawing wherein.

Figure 1:
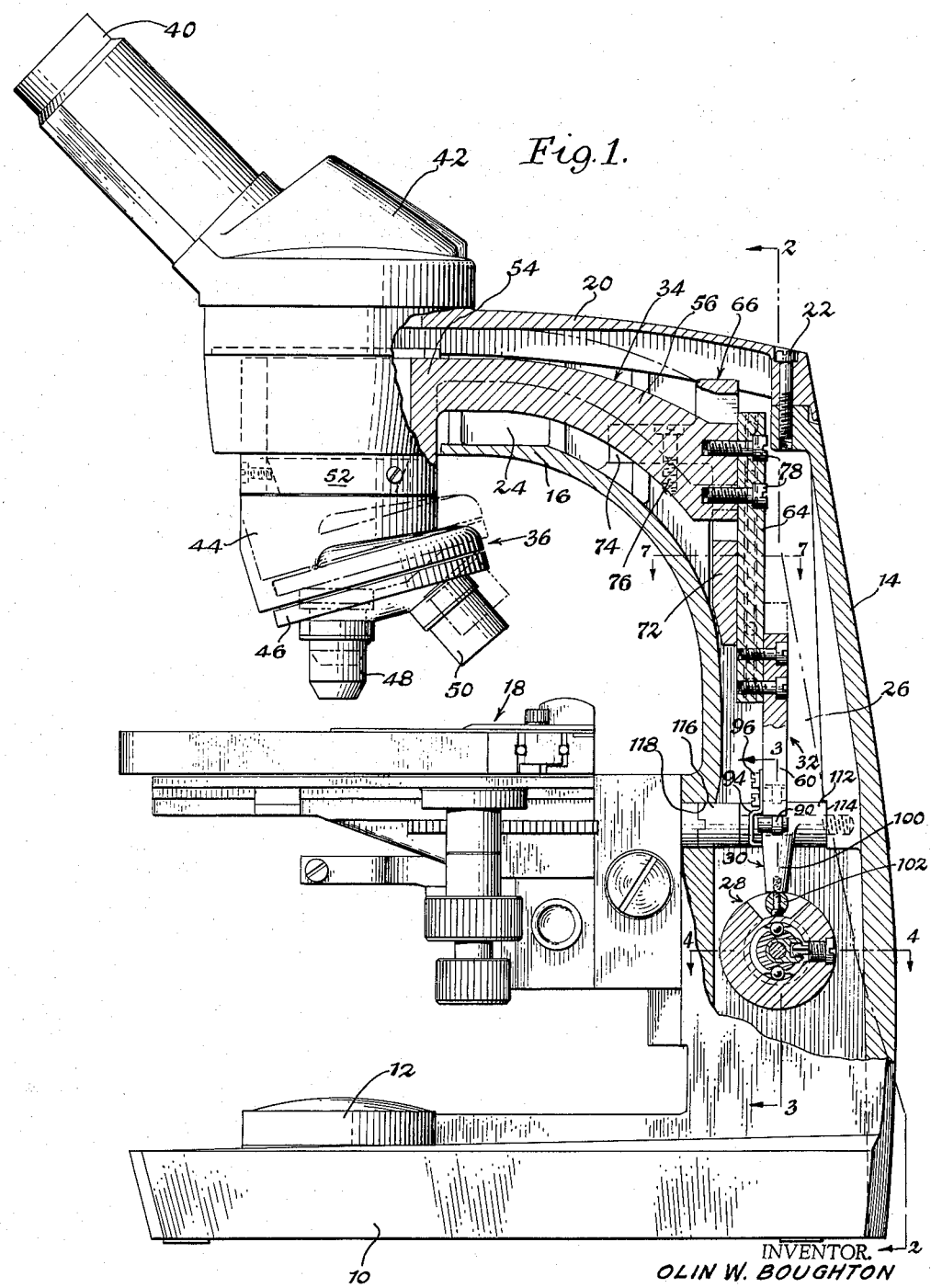
FIG. 1 is a side elevational view partly broken away showing the microscope constructed in accordance with the present invention.

Referring now more particularly to FIG. 1, the microscope as is shown therein will be seen to consist of a base 10 having suitable illuminating means 12 or the equivalent mounted thereon and preferably formed integral with or otherwise rigidly vertically extending from the base 10 is the hollow standard 14 having a generally horizontally extending arm 16 at its upper end. Rigidly mounted on the standard 14 above the illuminating means 12 is a stage indicated generally by the reference character 18, the details of which form no part of the present invention. The arm 16 is provided with a removable cover 20, secured as by means of a plurality of fasteners 22 and it will be seen that the arm 16 and the cover 20 are contoured so as to provide a hollow continuation 24 of the interior 26 of the standard 14.

The hollow nature of the frame as aforesaid provides means whereby the adjustment mechanism hereinafter described is disposed internally of the supporting structure or framework for the microscope. The adjustment mechanism includes, in general, the coarse and fine adjustment means indicated generally by the reference character 28, which acts upon the bell crank indicated by the reference character 30. The bell crank 30 operates through the medium of the link assembly indicated generally by reference character 32 to raise and lower a carriage assembly indicated generally by the reference character 34 which, as will be seen, carries the nosepiece indicated generally by the reference character 36.

The eyepiece 40 is carried by a head assembly 42 carried by the cover 20 and the mounting as between the head 42 and cover 20 may be such as to permit of rotary motion therebetween about a vertical axis so that the eyepiece 40 may be swung to other and different positions than as is shown in FIG. 1. In the specific structure shown, the nosepiece 36 includes a body portion 44 carrying at its lower end a rotatably mounted carrier 46 which supports a plurality of microscope objectives such as those indicated by reference characters 48 and 50. It is to be understood, however, that but a single microscope objective may be utilized or a plurality as is specifically shown. The body 44 is fixed to and carried by the lower end 52 of the head 54 of the carriage assembly 34. Projecting laterally from this head 54 is the arm portion 56 which is connected to the linkage assembly 32 previously mentioned.

The linkage assembly 32 includes the lower link portion 60 which is rigidly attached as by fasteners 62 to the lower end of the upper link portion 64. The upper link portion 64 is slidably and guidably received by a yoke assembly indicated generally by reference character 66. The yoke assembly includes an inverted U-shaped member having depending leg portions 68 and 70, see particularly FIG. 2, which may be interconnected adjacent their lower ends in the region indicated by reference tremities of the leg portions 68 and 70 are provided with character 72, see particularly FIG. 1, and the upper ex- horizontal extensions such as that indicated by reference character 74 in FIG. 1 which straddle the arm member 56 and rest upon interior surface portions of the arm 16 to be secured thereto as by suitable fasteners such as that indicated by reference character 76 in FIG. 1. The yoke assembly 66 provides a support for the entire carriage assembly 34 and the associated nosepiece assembly 36 and also provides a slidable guide for the linkage assembly 32. The upper link member 64 is rigidly connected to the arm 56 as by the fasteners 78 and the opposite vertical sides of this upper link member 64 are grooved to receive portions of the ball members 80, see particularly FIG. 2, which are recessed within opposed inner side surfaces of a pair of plates 82 and 84 which are secured, as by fasteners 86 and 88, to the leg portions 68 and 70. Thus, it will be seen that the upper link member 64 is constrained for vertical sliding motion by the yoke assembly 66 and since the arm 56 is cantilevered from this upper link member 64, the entire carriage assembly 34 and the associated nosepiece assembly 36 are also constrained for vertical movement by the yoke assembly.

Figure 2:
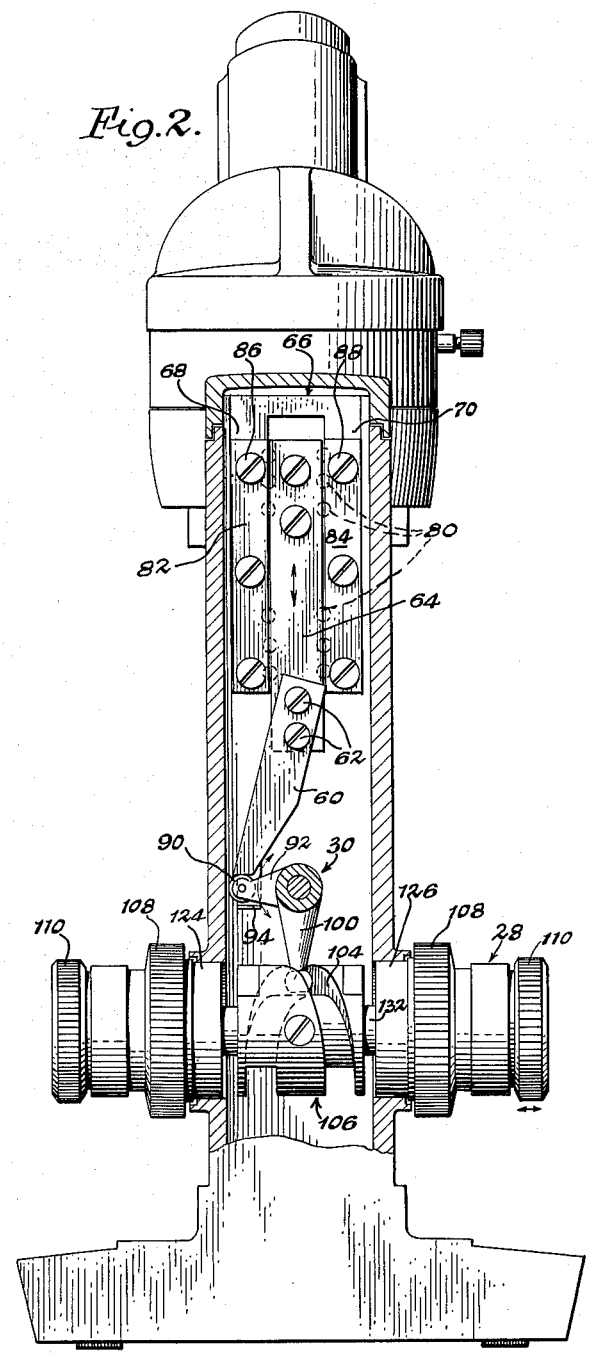
FIG. 2 is a vertical section taken substantially along the plane of section line 2—2 in FIG. 1 showing certain details of the coarse and fine adjustment mechanism.

The lower member 60 rests upon the roller 90 carried at the extremity of the arm 92 of the bell crank assembly 30, see particularly FIG. 2. A retainer finger 94, see particularly FIG. 1, is secured to the lower extremity of the link member 60 as by fasteners 96 for the purpose of limiting separation between the roller 90 and the link 60 so as to permit the nosepiece assembly 36 to be manually raised somewhat as for manipulative purposes relative to the stage or more particularly to an objective piece placed upon the stage 18 without disturbing the position of the nosepiece assembly as established by the coarse and fine adjustment mechanism. At the same time, the retainer member 94 prevents such wide separation between the link 60 and the roller 90 that subsequent dropping of the nosepiece might cause damage to the mechanism.

The bell crank 30 includes, in addition to the aforementioned lever arm 92 the depending lever arm 100 which is either formed or is provided at its lower extremity with a smooth enlarged follower member 102, see particularly FIG. 1. The follower 102 is engaged within the groove 104 of a cylindrical or rotary cam assembly indicated generally by the reference character 106, it being preferred that the groove 104 is of constant pitch and which extends throughout 360° or better on the cylindrical cam member.

As can be best seen in FIG. 2, the coarse and fine adjustment mechanism 28 includes a pair of coarse adjustment knobs 108 and a pair of fine adjustment knobs 110. Generally speaking, the mechanism hereinafter to be described is such that the cylindrical cam 106 is moved in unison with the coarse adjustment knobs 108 so as to effect a rapid motion of the bell crank 30 whereas the fine adjustment knobs 110 effect translatory motion of the cylindrical cam 106 to effect fine control of the bell crank 30. The bell crank itself, as can be seen in FIG. 1, is provided with an elongate hub portion 112 having one end which is engaged with an interior surface portion or boss of the frame at the interface 114 and a fastener element, having an enlarged head 116, journals the hub 112 thereon and threadedly engages into the frame as is shown. At the same time, it will be seen that the enlarged head 116 is journalled in the frame at the interface 118 substantially as is shown.

Figure 3:
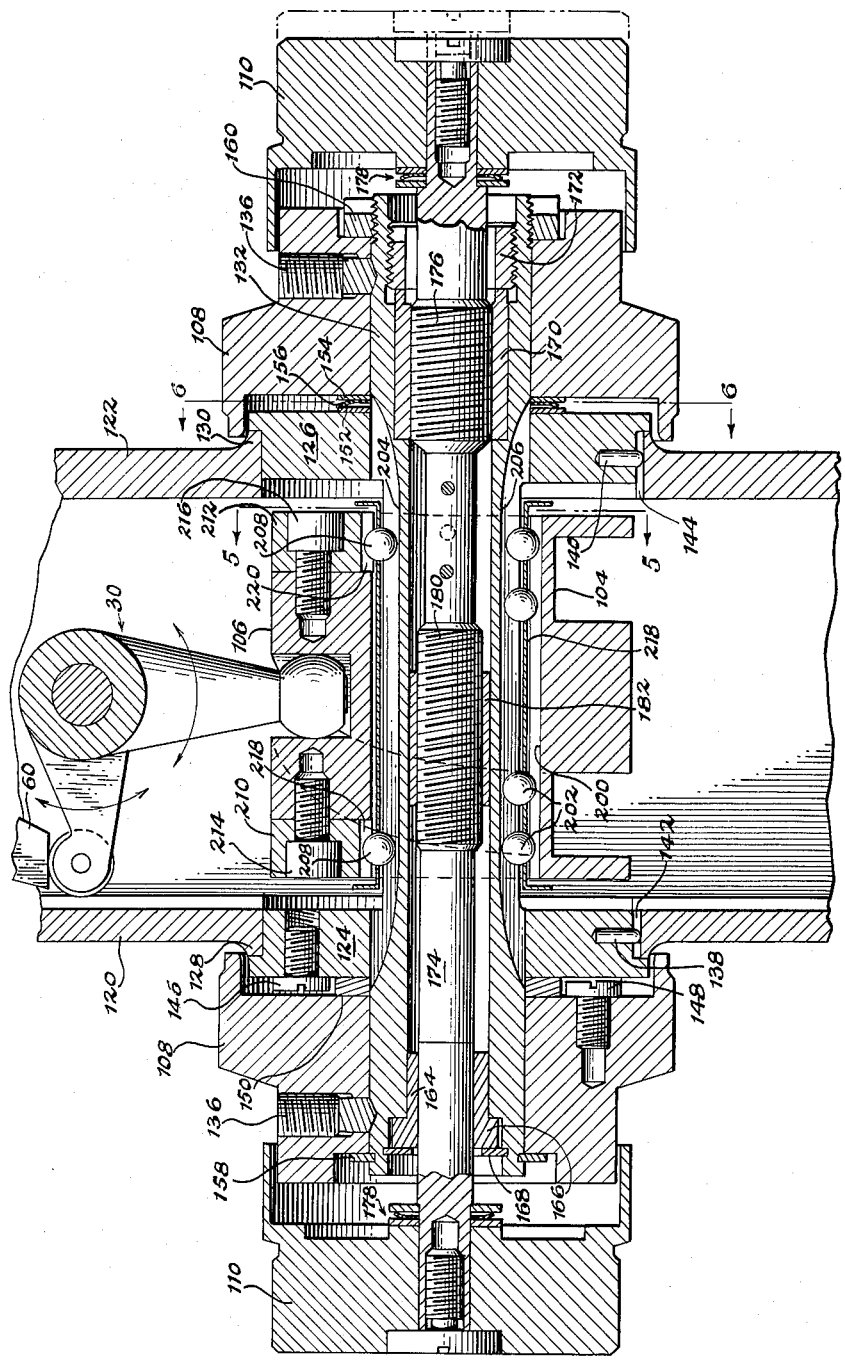
FIG. 3 is an enlarged vertical section taken substantially along the plane of section line 3—3 in FIG. 1 showing details of the adjustment mechanism.

Referring now more particularly to FIG. 3, it will be seen that the opposite side walls 120 and 122 of the standard 14 are provided with aligned enlarged apertures receiving the bearing members 124 and 126 which are shouldered to bear against the exterior boss configurations 128 and 130, substantially as is shown. These bearing members 124 and 126 are provided for the purpose of permitting the cylindrical cam 106 to be inserted in operative position as is shown, during assembly and their purpose is to provide, in addition, journal support for the quill shaft 132 which is keyed directly to the cylindrical cam 106 in a fashion hereinafter more particularly set forth. The coarse adjustment knobs 108, on the other hand, are feathered, as by set screws 136 to the quill shaft 132 so as to directly connect the coarse adjustment knobs 108 to the quill shaft and to the cylindrical cam 106 by the aforementioned key connection therebetween so that, as above mentioned, the cylindrical cam 106 rotates in unison with the coarse adjustment knobs 108. The two bearing plugs 124 and 126 are provided with lock pins 138 and 140 which are received in grooves 142 and 144 provided in side walls 120 and 122 so as to prevent rotation of the members 124 and 126, as will be readily apparent. The member 124 carries a stop member in the form of a screw threaded fastener 146 and the inner face of the left-hand coarse adjustment knob 108 in FIG. 3 is provided with an abutment member in the form of a screw threaded fastener 148 so that the two elements 146 and 148 cooperate to limit the rotary adjustment of the cylindrical cam 106 to slightly less than 360°. To provide the requisite clearance for the engagement between the members 146 and 148, a spacer collar 150 is provided, as shown. Additionally, in order to produce a predetermined amount of drag or frictional resistance to turning of the adjustment knobs 108, a brake assembly in the form of a pair of washers 152 and 154 and an interposed deformable spring washer 156, shown at the right-hand side in FIG. 3, are interposed or placed between the member 126 and the corresponding coarse adjustment knob 108. By virtue of the fact that the spring clip 158 at the left-hand extremity of the quill shaft 132 fixes the position of the coarse adjustment knob 108 relative thereto, it can be seen that when the parts are assembled, the right-hand coarse adjustment knob 108 is positioned by tightening up on the nut member 160 to achieve the requisite drag or frictional resistance by virtue of the members 152, 154 and 156 whereafter the right-hand adjustment knob 108 is locked in place by its related set screw 136.

The quill shaft 132 carries a bearing member 164 at its left-hand end in FIG. 3 which is shouldered as at 166 to engage against the counterbore in the quill shaft as shown and the spring clip 168 serves to locate this bushing 164 substantially as is shown. At the right-hand end of the quill shaft 132 in FIG. 3, there is provided an internally threaded bushing 170 which is locked in place relative to the quill shaft by means of the nut member 172 which bears against the internally threaded bushing 170 with sufficient force to hold it in place relative to the quill shaft 132. The bushing 164 taken in conjunction with the internally threaded bushing 170 provides a journal for the fine adjustment shaft 174 and, as will be appreciated, when the fine adjustment shaft 174 is rotated, the threaded portion 176 thereof which is engaged with the bushing 170 will effect translatory motion of this shaft 174. Connection between the opposite ends of the fine adjustment shaft 174 and the fine adjustment knobs 110 is achieved by virtue of overload clutch mechanisms 178 which are similar in form and function to the elements 152, 154 and 156 previously described.

The central region of the fine adjustment shaft 174 is provided with an additional threaded portion 180 upon which is engaged a traveling nut member 182. The lead or pitch of the threads on the portion 180 is different from the lead or pitch on the portion 176 so that a differential action is achieved thereby. That is to say, upon rotation of the fine adjustment shaft 174, the traveling nut 182 will move relative to the quill shaft by an amount which is a function of a difference in the pitch between the threads on the portion 176 and 180. As will be hereinafter described, the traveling nut 182 is coupled to the cylindrical cam 106 to effect translatory motion thereof. Thus, whereas the coarse adjustment knobs 108 directly rotate the cylindrical cam 106 and therefore achieve a fast motion or movement of the bell crank 30, rotation of the fine adjustment knobs 110 will effect a translatory motion of the cylindrical cam 106 and a very much slower movement of the bell crank 30. In a practical embodiment of the present invention, the range of adjustment for the coarse adjustment shaft is one revolution which is effective to produce a total movement of .625 inch of the nosepiece. The ten revolutions of the fine adjustment shaft will achieve a total vertical adjustment of the nosepiece of 2 millimeters.

Figure 4:
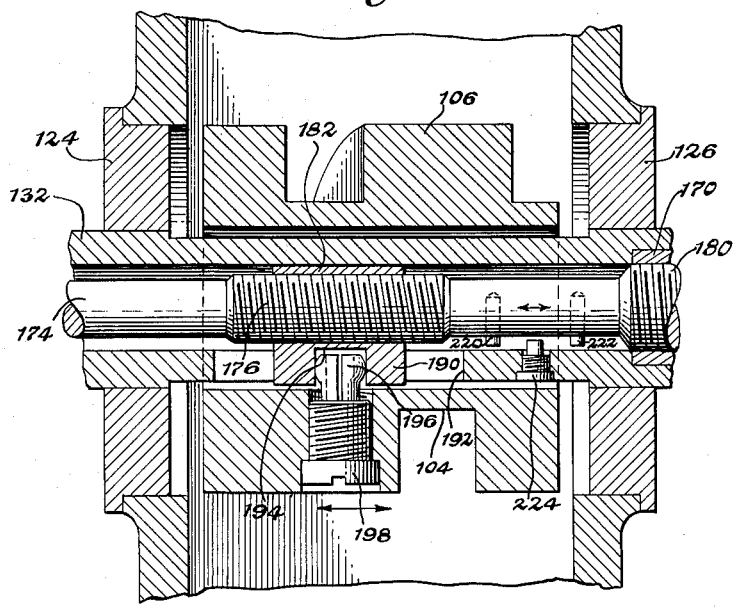
FIG. 4 is an enlarged horizontal section taken substantially along the plane of section line 4—4 in FIG. 1 showing further details of the adjustment mechanism and, in particularity, details of the fine adjustment mechanism.

Referring now more particularly to FIG. 4, it will be noted that the traveling nut member 182 is provided with a lateral extension 190 and the quill shaft 132 is provided with a longitudinally elongate slot 192 providing clearance for the lateral extension 190. The extension 190 is provided with a recess 194 receiving the inner end 196 of a coupling element 198. The coupling element may conveniently take the form of a screw thread member engaged with the cylindrical cam 106 and the inner end 196 thereof may be bifurcated or otherwise provided with a plurality of prongs so as to be closely fitted within the recess 194 so as to avoid any lost motion between cam 106 and nut member 182 longitudinally of the quill shaft 132.

As is shown more clearly in FIG. 3, the inner surface of the cylindrical cam 106 is provided with a longitudinally extending groove 200 within which a plurality of ball members 202 are engaged. The quill shaft 132 is provided with a diametrically opposed pair of longitudinally extending grooves 204 and 206. The aforementioned ball members 202 ride in both the groove 200 and the groove 206 and an additional pair of ball members 208 ride in the quill shaft groove 204 for assembly purposes, a pair of key members 210 and 212 are removably received in corresponding slots in the cylindrical cam 106 by suitable fasteners 214 and 216 and these key members are provided with grooves 218 and 220 within which the ball members 208 also ride.

Figure 5:
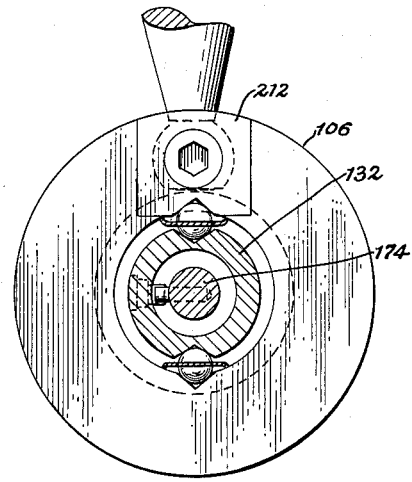
FIG. 5 is a transverse section taken substantially along the plane of section line 5—5 in FIG. 3 showing the translatory guide means for the rotary cam member.
Figure 6:
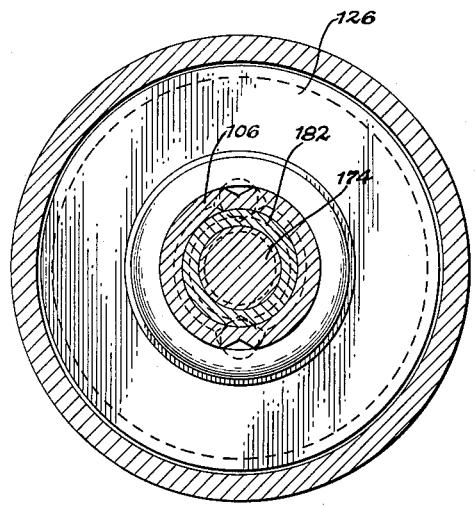
FIG. 6 is a transverse section taken substantially along the plane of section line 6—6 in FIG. 3.
Figure 7:
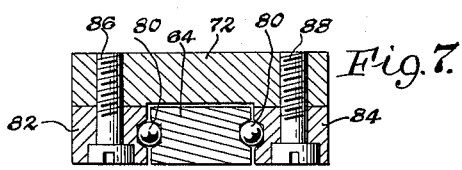
FIG. 7 is an enlarged horizontal section taken along the plane of section line 7—7 in FIG. 1, showing details of the linkage and support therefor.

To retain the several ball members in position relative to one another longitudinally of the quill shaft 132, a suitable retainer 218 may be provided, as is shown. Thus, it will be manifest that the ball members 202 and 208 not only permit the cylindrical cam 106 to move longitudinally of the quill shaft 132 but that they also prevent relative rotation between these elements. This relationship is shown more clearly in FIG. 5. To limit movement of the traveling nut member 182, the fine adjustment shaft 174 may be provided with a pair of longitudinally spaced abutment members 220, 222 and the quill shaft 132 with an intervening stop member 224 substantially as is shown in FIG. 4. It will be obvious that by proper placement of the abutment members 220 both longitudinally with respect to each other and circumferentially upon the fine adjustment shaft, that they will engage the stop member 224 at the extremities of the permissible movement of the traveling nut member 182.

It is to be understood that certain changes and modifications as illustrated and described may be made without departing from the spirit of the invention or the scope of the following claims.

I claim:

1. In a microscope,
a frame having a base, an upright portion and an arm portion overhanging said base,
a stage carried by said upright portion,
a yoke assembly fixed within said frame adjacent the juncture between said upright and arm portions,
a carrier arm mounted for vertical sliding motion on said yoke assembly and extending therefrom outwardly within said arm portion,
microscope objective means supported by the free end of said carrier arm for vertical adjustment therewith relative to said stage,
linkage means connected to said carrier arm for effecting vertical positioning thereof and including a bell crank for controllably moving the same,
and adjustment mechanism including a cylindrical cam with which said bell crank is engaged; a coarse adjustment quill shaft, means slidably keying said cylindrical cam upon said quill shaft; a fine adjustment shaft projecting through said quill shaft; a first nut member fixed to said quill shaft and threadedly engaging said fine adjustment shaft; a second nut member slidably keyed within said quill shaft, engaging said cylindrical cam and with which said fine adjustment shaft is threadedly engaged,
said nut members being threaded in the same direction but with different pitches.

2. In a microscope,
a frame having a base, an upright portion and an arm portion overhanging said base,
a stage carried by said upright portion,
carriage means within said frame including a generally horizontal arm member received within said arm portion of the frame, and a linkage assembly fixed to one end of said arm member and depending therefrom within the confines of said upright portion,
means supporting said carriage means for vertical sliding motion within said frame,
microscope objective means supported by the free end of said arm member for vertical adjustment therewith relative to said stage,
a bell crank pivotally mounted within said upright portion and engaging said linkage assembly to vertically move said carriage means,
and adjustment mechanism including a cylindrical cam with which said bell crank is engaged; a coarse adjustment quill shaft, means slidably keying said cylindrical cam upon said quill shaft; a fine adjustment shaft projecting through said quill shaft; a first nut member fixed to said quill shaft and threadedly engaging said fine adjustment shaft; a second nut member slidably keyed within said quill shaft, engaging said cylindrical cam and with which said fine adjustment shaft is threadedly engaged,
said nut members being threaded in the same direction but with different pitches.

References Cited by the Examiner

UNITED STATES PATENTS

| 262,634 | 8/1882 | Yawman | 88—39 |
| 1,984,127 | 12/1934 | Gallasch | 88—39 |
| 2,208,839 | 7/1940 | Gallasch et al. | 88—39 |
| 2,489,487 | 11/1949 | Gradisar | 88—39 |
| 2,859,657 | 11/1958 | Harker | 88—20 |
| 3,019,707 | 2/1962 | Straat | 88—39 |

FOREIGN PATENTS 819,899  9/1959  Great Britain.

DAVID H. RUBIN, *Primary Examiner.*